(12) United States Patent
Ash et al.

(10) Patent No.: US 9,298,397 B2
(45) Date of Patent: Mar. 29, 2016

(54) NONVOLATILE STORAGE THRESHOLDING FOR ULTRA-SSD, SSD, AND HDD DRIVE INTERMIX

(71) Applicant: GLOBALFOUNDRIES U.S. 2 LLC, Hopewell Junction, NY (US)

(72) Inventors: Kevin J. Ash, Tucson, AZ (US); Lokesh M. Gupta, Tucson, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 130 days.

(21) Appl. No.: 14/077,917

(22) Filed: Nov. 12, 2013

(65) Prior Publication Data

US 2015/0134878 A1    May 14, 2015

(51) Int. Cl.
   *G06F 3/06* (2006.01)
(52) U.S. Cl.
   CPC ............ *G06F 3/0685* (2013.01); *G06F 3/0604* (2013.01); *G06F 3/0646* (2013.01)
(58) Field of Classification Search
   None
   See application file for complete search history.

(56) References Cited

U.S. PATENT DOCUMENTS

| 8,140,763 | B2 | 3/2012 | Ash et al. |
| 8,478,945 | B2 | 7/2013 | Ash et al. |
| 2009/0276567 | A1* | 11/2009 | Burkey ........................ 711/114 |
| 2010/0325356 | A1* | 12/2010 | Ash et al. ..................... 711/113 |
| 2013/0110966 | A1 | 5/2013 | Nagami et al. |
| 2013/0111117 | A1 | 5/2013 | Yang et al. |
| 2013/0185475 | A1 | 7/2013 | Talagala et al. |
| 2013/0246686 | A1 | 9/2013 | Noborikawa et al. |

FOREIGN PATENT DOCUMENTS

EP    00176014 A1    3/2007

OTHER PUBLICATIONS

Matthews, et al., Intel_R Turbo Memory: Nonvolatile Disk Caches in the Storage Hierarchy of Mainstream Computer Systems, ACM.

* cited by examiner

*Primary Examiner* — Jared Rutz
*Assistant Examiner* — Stephanie Wu
(74) *Attorney, Agent, or Firm* — Gibb & Riley, LLC

(57) ABSTRACT

Embodiments for efficient thresholding of nonvolatile storage (NVS) for a plurality of types of storage rank groups by a processor. Target storage devices are determined in a pool of target storage devices as one of a hard disk drive (HDD) and a solid-state drive (SSD) device. Each target storage device classified into an SSD rank group, a Nearline rank group, an Enterprise rank group, and an Ultra-SSD rank group in the pool of target storage devices. The Nearline rank group and the Enterprise rank group comprise a HDD rank group, and the Nearline rank group, the Enterprise rank group, and the SSD rank group comprise the Non-Ultra-SSD rank group. Thresholds are adjusted for preventing space allocation in the NVS for at least one of the classified target storage devices based on one of the presence and absence of identified types of the classified target storage devices.

12 Claims, 5 Drawing Sheets

NONVOLATILE STORAGE THRESHOLDING FOR ULTRA-SSD, SSD, AND HDD DRIVE INTERMIX

BACKGROUND OF THE INVENTION

1. Field of the Invention

The present invention relates in general to computers, and more particularly to a method, system, and computer program product for nonvolatile storage thresholding for ultra-SSD, SSD, and HDD drive intermix.

2. Description of the Related Art

Storage devices such as disks are commonplace in today's society. Devices such as controllers control access to the storage devices in response to read and write requests. The storage controllers also mirror data to different storage devices and spread data amongst different storage devices for redundancy and backup purposes. Storage controllers may store data in accordance with one of several redundant array of independent disk (RAID) security levels. Generally, the higher the RAID level the greater the redundancy of the data storage. Pooled storage devices may be used to increase storage capacity and provide recovery and backup services.

Storage servers, such as an IBM® Enterprise Storage Server® (ESS), are also becoming commonplace. One IBM® ESS storage server includes two clusters of processors (controllers) and associated hardware. Typically, there are multiple processors in each cluster. Each of the storage controllers is responsible for multiple storage devices grouped in RAID arrays. In one environment, clients with Fibre Channel Host Bus Adapters (HBAs) are coupled via a Fibre Channel to a switch. The switch is also coupled to the Storage Server with Fibre Channel HBAs. There may be multiple storage servers per client. Each client is assigned or allocated storage "volumes" which are mapped to physical locations on storage devices that are grouped in RAID arrays. Consequently, clients make data access requests (reads and writes) to the storage server, for data within their allocated volumes, and the storage server accesses the mapped locations in cache storage to satisfy the requests or from disk if the data does not reside in cache storage.

One IBM® ESS comprises a storage controller with two clusters and four processors per cluster. Each cluster has its own cache (semiconductor) memory shared by all processors in the cluster. Each cluster also has nonvolatile storage (NVS) that is shared by all of the processors in the cluster. The cache memory is used for rapid access to data inpaged from external storage to service read data access requests from memory and to provide buffering of modified data. All write requests are written to the cache on the cluster managing a given volume and are mirrored in the nonvolatile memory on the other cluster.

SUMMARY OF THE INVENTION

In one embodiment, a method is provided for efficient thresholding of nonvolatile storage (NVS) for multiple types of storage rank groups using a processor device in a computing environment. In one embodiment, by way of example only, target storage devices are determined in a pool of target storage devices as one of a hard disk drive (HDD) and a solid-state drive (SSD) device. Each target storage device classified into an SSD rank group, a Nearline rank group, an Enterprise rank group, and an Ultra-SSD rank group in the pool of target storage devices. The Nearline rank group and the Enterprise rank group comprise a HDD rank group, and the Nearline rank group, the Enterprise rank group, and the SSD rank group comprise the Non-Ultra-SSD rank group. Thresholds are adjusted for preventing space allocation in the NVS for at least one of the classified target storage devices based on one of the presence and absence of identified types of the classified target storage devices.

In another embodiment, a computer system is for efficient thresholding of nonvolatile storage (NVS) for multiple types of storage rank groups using a processor device, in a computing environment. The computer system includes a computer-readable medium and a processor in operable communication with the computer-readable medium. In one embodiment, by way of example only, the processor determines target storage devices in a pool of target storage devices as either a hard disk drive (HDD), a solid-state drive (SSD) device, and/or an Ultra-SSD device. Each target storage device classified into an SSD rank group, a Nearline rank group, an Enterprise rank group, and an Ultra-SSD rank group in the pool of target storage devices. The Nearline rank group and the Enterprise rank group comprise a HDD rank group, and the Nearline rank group, the Enterprise rank group, and the SSD rank group comprise the Non-Ultra-SSD rank group. Thresholds are adjusted for preventing space allocation in the NVS for at least one of the classified target storage devices based on one of the presence and absence of identified types of the classified target storage devices.

In a further embodiment, a computer program product is provided for efficient thresholding of nonvolatile storage (NVS) for multiple types of storage rank groups using a processor device, in a computing environment. The computer-readable storage medium has computer-readable program code portions stored thereon. The computer-readable program code portions include a first executable portion that determines target storage devices in a pool of target storage devices as one of a hard disk drive (HDD) and a solid-state drive (SSD) device. Each target storage device classified into an SSD rank group, a Nearline rank group, an Enterprise rank group, and an Ultra-SSD rank group in the pool of target storage devices. The Nearline rank group and the Enterprise rank group comprise a HDD rank group, and the Nearline rank group, the Enterprise rank group, and the SSD rank group comprise the Non-Ultra-SSD rank group. Thresholds are adjusted for preventing space allocation in the NVS for at least one of the classified target storage devices based on one of the presence and absence of identified types of the classified target storage devices.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
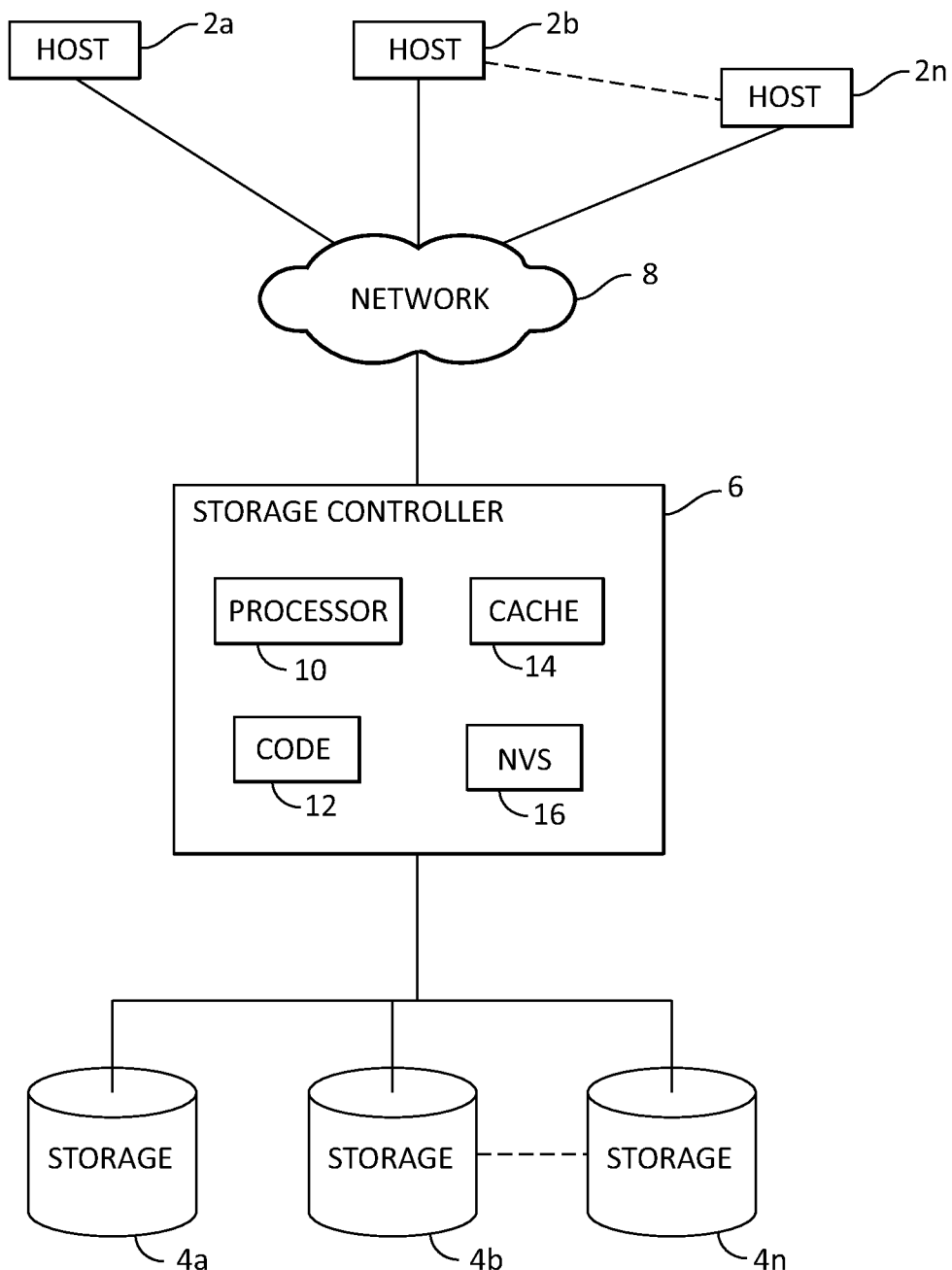
FIG. 1 is a block diagram of an exemplary computing environment in which aspects of the present invention and claimed subject matter are implemented.

In one embodiment, by way of example only, in cached controllers, embodiments allow for NVS space to be threshold (e.g., up to 25%) based on the storage device's individual rank. This prevents a single rank failure from consuming all of the available NVS space, and allows for multiple rank failures before all of the available NVS space is consumed by failed ranks. With the addition of differing types of storage media to storage servers, such as so-called "Nearline" class disk drives, which reduce their speed in order to correspondingly reduce their operating temperature in heavy use scenarios, typical Enterprise class hard disk drives (HDD), and more recently, solid-state drives (SSD) making use of flash memory devices, each storage media has accompanying performance characteristics. For example, SSD devices significantly reduce latency and provide increased performance vis-à-vis traditional HDD devices. As a result, a need exists for a mechanism to dynamically allocate NVS space based on the type of storage media addressed, so as to allow devices such as SDD devices to operate efficiently while preventing the available NVS space from being consumed by slower devices.

Moreover, additional thresholding of the present invention is used to recognize and threshold the amount of NVS that can be used for Nearline Drives. These drives have the characteristic that when being overdriven, they slow down to cool, and can eventually stop if they get too hot. The current thresholding rules are when Nearline rank groups exist with Enterprise or SSD rank groups, then the collection of Nearline rank groups is only allowed to consume 50% of NVS. In one embodiment, with the introduction of Ultra-SSDs, and the Ultra-SSD's highly increased performance when compared to prior generation SSDs and HDDs (Hard Disk Drives), a new thresholding algorithm is needed to prevent the slower prior generation SSD and HDD ranks from consuming all of the NVS space, and preventing the faster Ultra-SSD ranks from performing at the peak levels. As a result, a need exists for, based on presence or absence of types of storage devices, adjust thresholds for stopping NVS allocations for each of various types of remaining storage devices. This allows Ultra-SSD ranks to run at peak performance, and to not be slowed down by SSD and HDD activity, and conversely, allows SSD and HDD ranks to perform at peak levels when Ultra-SSD ranks do not exist.

Thus, in one embodiment, the present invention identifies when Ultra-SSD ranks exist with SSD and/or HDD ranks, and to adjust NVS thresholds for HDD, SSD, and Ultra-SSD ranks. This allows Ultra-SSD ranks to run at peak performance, and to not be slowed down by SSD and HDD activity, and conversely, allows SSD and HDD ranks to perform at peak levels when Ultra-SSD ranks do not exist. Also, NVS code recognizes four rank groups: the Nearline rank group, the Enterprise rank group, the SSD rank group, and the Ultra-SSD rank group. In one embodiment, the Nearline rank group and the Enterprise rank group also comprise the HDD group. The Nearline rank group, the Enterprise rank group, and the SSD rank group comprise the non-Ultra-SSD group. In one embodiment, by way of example only, there are six groups (from slowest to fastest): 1) a Nearline group, 2) an Enterprise group, 3) an HDD group that is the Nearline and the Enterprise group combined, 4) an SSD group, 5) a Non-Ultra SSD group that is the Nearline group, the Enterprise group, and the SSD group combined, and 6) an Ultra-SSD group.

In one embodiment, when there is only one type of rank group, that rank group is allowed to consume 100% of the NVS space. When the Nearline rank group exists with either the Enterprise rank group, the SSD rank group, or the Ultra-SSD rank group, then the Nearline rank group is allowed to consume at most 50% of NVS. When the Enterprise rank group exists only with the Nearline rank group, then the Enterprise rank group is allowed to consume at most 99% of NVS.

When the Ultra-SSD rank group does not exist, then if the SSD rank group does exist with either the Enterprise or Nearline (HDD group) rank groups, then the combined Nearline and Enterprise rank group is allowed to consume at most 95% of NVS. This guarantees that the SSD rank group has a minimum of 5% of NVS. This reduced HDD threshold allows for the faster SDD ranks to not have to wait behind the slower HDD ranks to obtain NVS space. This in turn increases the SSD peak performance, and does not impact the slower HDD rank performance.

When the Ultra-SSD rank group does exist, then if the SSD rank group does exist with either the Enterprise or Nearline (HDD group) rank groups, then the combined Nearline and Enterprise rank group is allowed to consume at most 90% of NVS, and the combined SSD and Nearline and Enterprise rank group is allowed to consume at most 95% of NVS. This guarantees that the Ultra-SSD rank group has a minimum of 5% of NVS. This reduced HDD and SSD threshold allows for the faster Ultra-SDD ranks to not have to wait behind the slower ranks to obtain NVS space. This in turn increases the Ultra-SSD peak performance, and does not impact the slower HDD and SSD performance.

Thus, in one embodiment, based on presence or absence of types of storage devices, adjust thresholds for stopping NVS allocations for each of various types of remaining storage devices. In one embodiment, by way of example only, target storage devices are determined in a pool of target storage devices as a hard disk drive (HDD) and/or a solid-state drive (SSD) device. Each target storage device classified into an SSD rank group, a Nearline rank group, an Enterprise rank group, and an Ultra-SSD rank group in the pool of target storage devices. The Nearline rank group and the Enterprise rank group comprise a HDD rank group, and the Nearline rank group, the Enterprise rank group, and the SSD rank group comprise the Non-Ultra-SSD rank group. Thresholds are adjusted for preventing space allocation in the NVS for at least one of the classified target storage devices based on one of the presence and absence of identified types of the classified target storage devices.

In one embodiment, the present invention sets a threshold of available space in the NVS to allocate at least a majority of available space to the HDD rank group, the SSD rank group, and/or the Ultra-SSD rank group, and reduces the threshold of the available space in the NVS to allocate a greater portion of the available space to one of the HDD rank group, the SSD rank group, and the Ultra-SSD rank group.

In one embodiment, the present invention identifies when the Ultra-SSD rank group exists with the SSD rank group and/or the HDD rank group. The thresholds are adjusted for preventing the space allocation in the NVS to the SSD rank group and/or the HDD rank group for allocating at least the majority of the available space to the Ultra-SSD rank. Alternatively, the thresholds may be adjusted for preventing the space allocation in the NVS to the Ultra-SSD rank group for allocating at least the majority of the available space to one of the SSD rank group and the HDD rank group.

In one embodiment, the present invention sets a threshold of the available space in the NVS to allocate at most approximately 50 percent of the available space to the Nearline rank group if the Nearline rank group exists with one of the Enterprise rank group, the SSD rank group, and the Ultra-SSD rank group.

In one embodiment, the present invention sets the threshold of the available space in the NVS to allocate at most approximately 99 percent of the available space to the Enterprise rank group if the Enterprise rank group exists only with the Nearline rank group.

In one embodiment, the present invention sets the threshold of the available space in the NVS to allocate at most approximately 95 percent of the available space to the Nearline rank group, and the Enterprise rank group, which are combined together, when the Ultra-SSD rank group does not exists and the SSD rank group does exist with one of the Enterprise rank group and the Nearline rank group.

In one embodiment, the present invention sets the threshold of the available space in the NVS to allocate at most approximately 90 percent of the available space to the Nearline rank group, and the Enterprise rank group, which are combined together, when the Ultra-SSD rank group does exists and the SSD rank group does exist with one of the Enterprise rank group and the Nearline rank group, and sets the threshold of the available space in the NVS to allocate at most approximately 95 percent of the available space to the Nearline rank group, and the SSD rank group, which are combined together, when the Ultra-SSD rank group does exists and the SSD rank group does exist with one of the Enterprise rank group and the Nearline rank group.

In one embodiment, the present invention allows one of the types of storage rank groups to consume 100 percent of the NVS if only that particular type of storage rank groups exists. In one embodiment, the present invention allows the Nearline rank group to consume at most approximately 50 percent of the NVS if the Nearline rank group exists with the Enterprise rank group, the SSD rank group, and/or the Ultra-SSD rank group.

In one embodiment, the present invention allows the Enterprise rank group to consume at most approximately 99 percent of the NVS if the Enterprise rank group exists only with the Nearline rank group.

In one embodiment, the present invention allows the Nearline rank group and the Enterprise rank group, which are combined together, to consume at most approximately 95 percent of the NVS when the Ultra-SSD rank group does not exist and the SSD rank group does exist with the Enterprise rank group and/or the Nearline rank group.

In one embodiment, the present invention allows the Nearline rank group, the Enterprise rank group, and the SSD rank group, which are combined together, to consume at most approximately 95 percent of the NVS when the Ultra-SSD rank group does exists and the SSD rank group does exist with one of the Enterprise rank group and the Nearline rank group.

In one embodiment, the present invention allows the Nearline rank group and the Enterprise rank group, which are combined together, to consume at most approximately 90 percent of the NVS when the Ultra-SSD rank group does exist and the SSD rank group does exist with one of the Enterprise rank group and the Nearline rank group.

The illustrated embodiments below provide mechanisms for facilitating data transfer between an NVS write cache and a pool of target storage devices. The pool may contain a variety of types of devices, such as SSD devices, Enterprise HDD devices, and Nearline HDD devices. The mechanisms of the present invention detect such devices and determine their classification into several rank groups, such as Nearline, SSD, and Enterprise rank groups. At initialization and/or at a later time when a device is added or removed from the pool, the threshold for NVS space for each of these groups is initially set as will be described. Based on current data movement (i.e., write activity), such as whether writes to the storage devices are occurring in a predetermined time, the available space in the NVS write cache is dynamically allocated. Such dynamic allocation prevents slower devices from consuming all available NVS space, while allowing higher performance devices to operate most efficiently.

In the following description, reference is made to the accompanying drawings which form a part hereof and which illustrate several embodiments of the present invention. It is understood that other embodiments may be utilized and structural and operational changes may be made without departing from the scope of the present invention. FIG. 1 illustrates a computing environment in which aspects of the invention are implemented. A plurality of host systems 2a, b . . . n transmit Input/Output (I/O) requests to one or more storage devices 4a, b . . . n through a storage controller 6 which manages access to the storage devices 4a, b . . . n. In certain implementations, the storage devices 4a, b . . . n are comprised of a plurality of hard disk drives organized as Just a Bunch of disks (JBOD), a RAID array, Direct Access Storage Devices (DASD), etc. Further, a storage device 4a, b . . . n may comprise a logical storage device, such as a RAID or JBOD rank. The host systems 2a, b . . . n communicate with the storage controller 6 over a network 8, such as the Internet, a Storage Area Network (SAN), an Intranet, Local Area Network (LAN), Wide Area Network (WAN), etc., using a communication protocol such as TCP/IP, Fibre Channel, Ethernet, etc.

The storage controller 6 includes a processor 10 executing code 12 to perform storage controller operations. The storage controller 6 further includes a cache 14 and non-volatile storage unit 16, such as a battery backed-up memory device. The storage controller 6 stores in cache 14 data updates received from the hosts 2 a, b . . . n to write to the storage devices 4a, b . . . n as well as data read from the storage devices 4a, b . . . n to return to the hosts 2a, b . . . n. When operating in Fast Write mode, data updates received from the hosts 2a, b . . . n are copied to both cache 14 and the NVS 16. End status is returned to the host 2a, b . . . n sending the data update after the update is copied to both the cache 14 and NVS 16.

Figure 2:
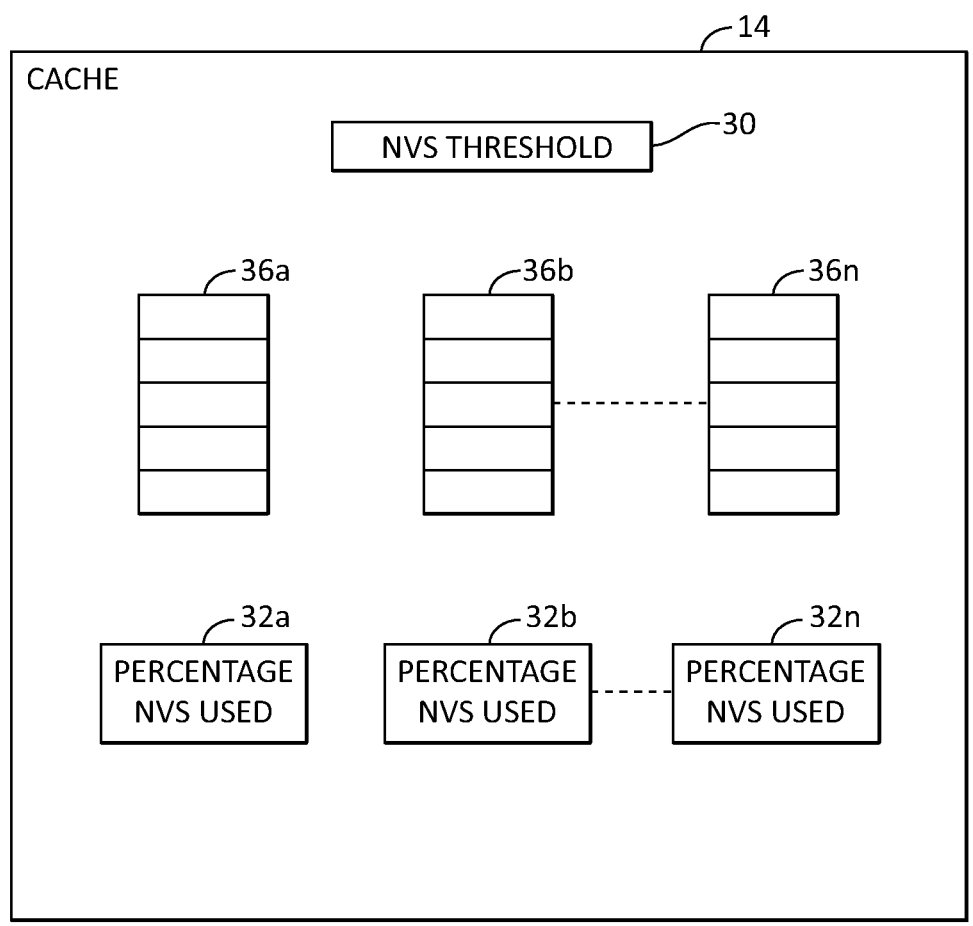
FIG. 2 is a block diagram of exemplary data structures maintained in the storage controller cache in accordance with implementations of the invention.

FIG. 2 illustrates further detail of the information the storage controller 6 maintains in cache 14 or some other storage or memory location. The cache 14 maintains an NVS threshold 30 indicating a maximum amount of storage space in the NVS 16 that may be used for updates to each storage device 4a, b . . . n. The cache 14 further maintains for each storage device, a percentage of NVS used 32a, b . . . n that indicates, for each storage device, the percentage of NVS 16 storing updates for the storage device 4a, b . . . n. In addition, for each storage device 4a, b . . . n, the cache 14 also includes a reconnect queue 36a, b . . . n. Each reconnect queue 36a, b . . . n includes entries of reconnect parameters to allow the processor 10 to reconnect to a channel to which the storage controller 6 issued a disconnect in response to receiving updates to a target storage device 4a, b . . . n when the NVS 16 already stored the threshold amount of storage space for that target storage device 4a, b . . . n.

In certain implementations where the storage device 4a, b . . . n is comprised of multiple disk drive units, such as the case with a RAID array, sequential updates are not destaged until an entire stripe unit of sequential updates is accumulated in the cache 14. After accumulating a stripe unit of updates, the updates are then destaged and striped to the disks of the target storage device 4a, b . . . n.

Figure 3:
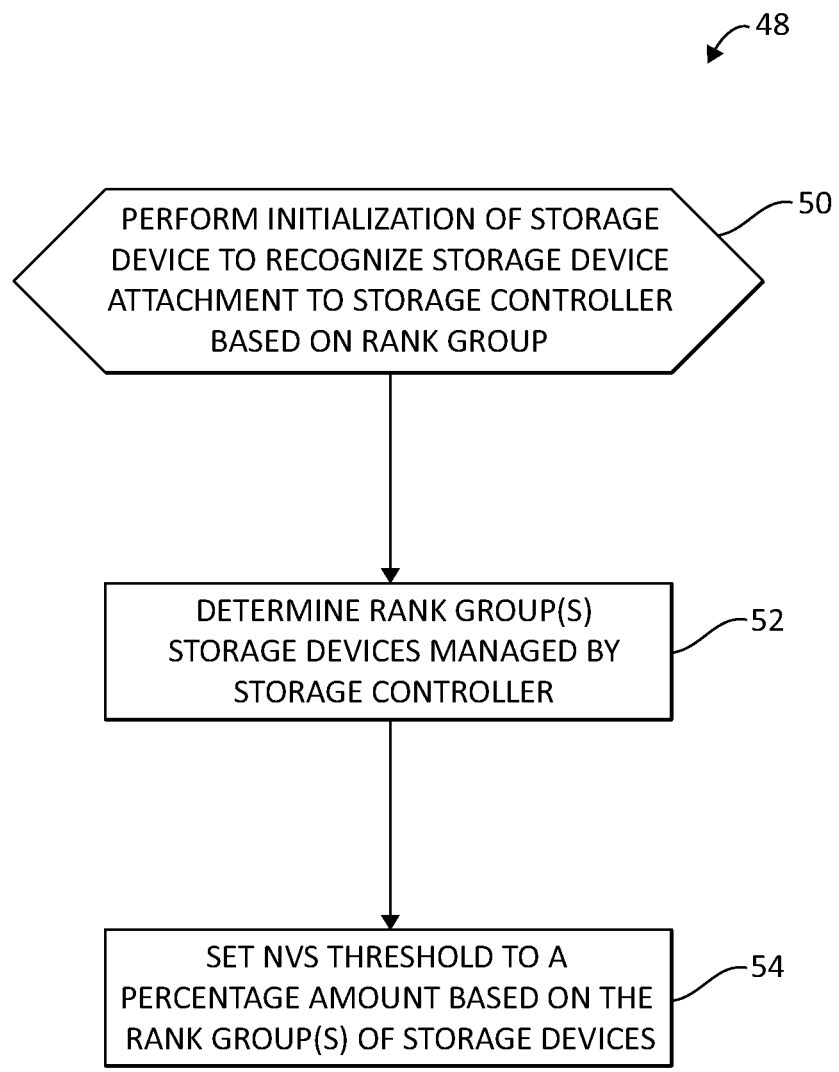
FIG. 3 is a flow chart diagram of exemplary logic to initialize an NVS threshold in accordance with implementations of the invention in which aspects of the present invention may be realized.

FIG. 3 illustrates logic 48 implemented in the code 12 to set the NVS threshold 30. At block 50, the processor 10 performs an initialization of one or more of the storage devices 4a, b . . . n as part of an initialization routine to recognize the attachment of various target storage devices based on their respective rank group. This initialization routine may be invoked during a reboot or restart operation in which the processor 10 would initialize all the storage devices 4a, b . . . n. Moreover, the initialization routine may be performed if a storage device or component thereof, such as a disk within the storage device, is removed or added from the group of storage devices 4a, b . . . n managed by the storage controller 6, such as the case of a hot reboot. In one example, the processor 10 may determine that a certain number of target storage devices are identified as SSD devices. The processor may also determine that an additional certain number of target storage devices are identified as Enterprise HDD devices.

At block 52, the processor 10 determines the rank groups of storage devices 4a, b . . . n attached to the storage controller 6. For example, the target storage devices identified as SSD devices are classified in the SSD rank group. Target storage devices identified as Enterprise HDD devices are classified in the Enterprise HDD rank group, a subgroup of the HDD rank group. Similarly, target storage devices identified as Nearline HDD devices are classified in the Nearline HDD rank group, also a subgroup of the HDD rank group. Target storage devices identified as Ultra-SSD are classified in the Ultra-SSD rank group.

At block 54, the NVS threshold is set to a percentage amount based on the rank group(s) of the target storage devices. Such an initial setting of the threshold is performed based on the types of target storage devices identified and classified in blocks 50 and 52. For example, in one embodiment, if only a single target storage device is identified, the NVS threshold is set to 100%, or in other words, 100% of the available NVS space is allocated to the single target storage device.

Continuing the exemplary embodiment, if a storage device identified as being a Nearline HDD device (and thereby classified in the Nearline rank group) exists only with other Enterprise rank group devices, the NVS threshold for the Enterprise rank group is set to at most, 99% of available NVS space (accordingly leaving at least 1% of available NVS space to the Nearline rank group device(s). When the Nearline rank group exists with either the Enterprise rank group, the SSD rank, or the Ultra-SSD rank group, then the Nearline rank group is allowed to consume, at most, 50% of available NVS space. When the SSD rank group exists with either the Enterprise or Nearline HDD rank groups, and the Ultra-SSD rank group is allowed to consume, at most, 95% available NVS space.

In this way, NVS 16 space is over allocated on a storage device basis to accommodate those target storage devices 4a, b . . . n that are particularly busy, and at the same time limit the allocation of NVS 16 to avoid delays in processing updates to the other storage devices 4a, b . . . n in the event that the storage device 4a, b . . . n whose updates dominate NVS 16 fails or when the destaging operations to the dominating storage device 4a, b . . . n are particularly slow. As mentioned, destage operations to a storage device 4a, b . . . n may proceed at a particularly slow rate as a result of background operations on the storage device 4a, b . . . n, such as an operation to rebuild a disk drive, or a large proportion of random (non-sequential) updates.

Those skilled in the art will appreciate that there are alternative techniques that may be used to set the NVS threshold 30 based on the exemplary rank groups previously described, such as allocation of the NVS 16 space equally among the storage devices 4a, b . . . n. Still further, determination of the NVS threshold 30 based on rank group type may incorporate additional calculations for each storage device 4a, b . . . n as a weighted average of the storage capacity of the storage device 4a, b . . . n, thereby allocating more NVS 16 space to larger storage devices relative to smaller storage devices because larger storage devices are more likely to have greater I/O activity.

In certain implementations, the above designated allocations to each storage device 4a, b . . . n may apply during an entire session during which the storage controller 6 is available and receiving I/Os. This allocation may remain static during the entire session to always assure that the updates for one particularly busy storage device 4a, b . . . n does not unduly dominate the NVS 16 with the potential for significantly adversely affecting the updates to the other less busy storage devices 4a, b . . . n.

Figure 4:
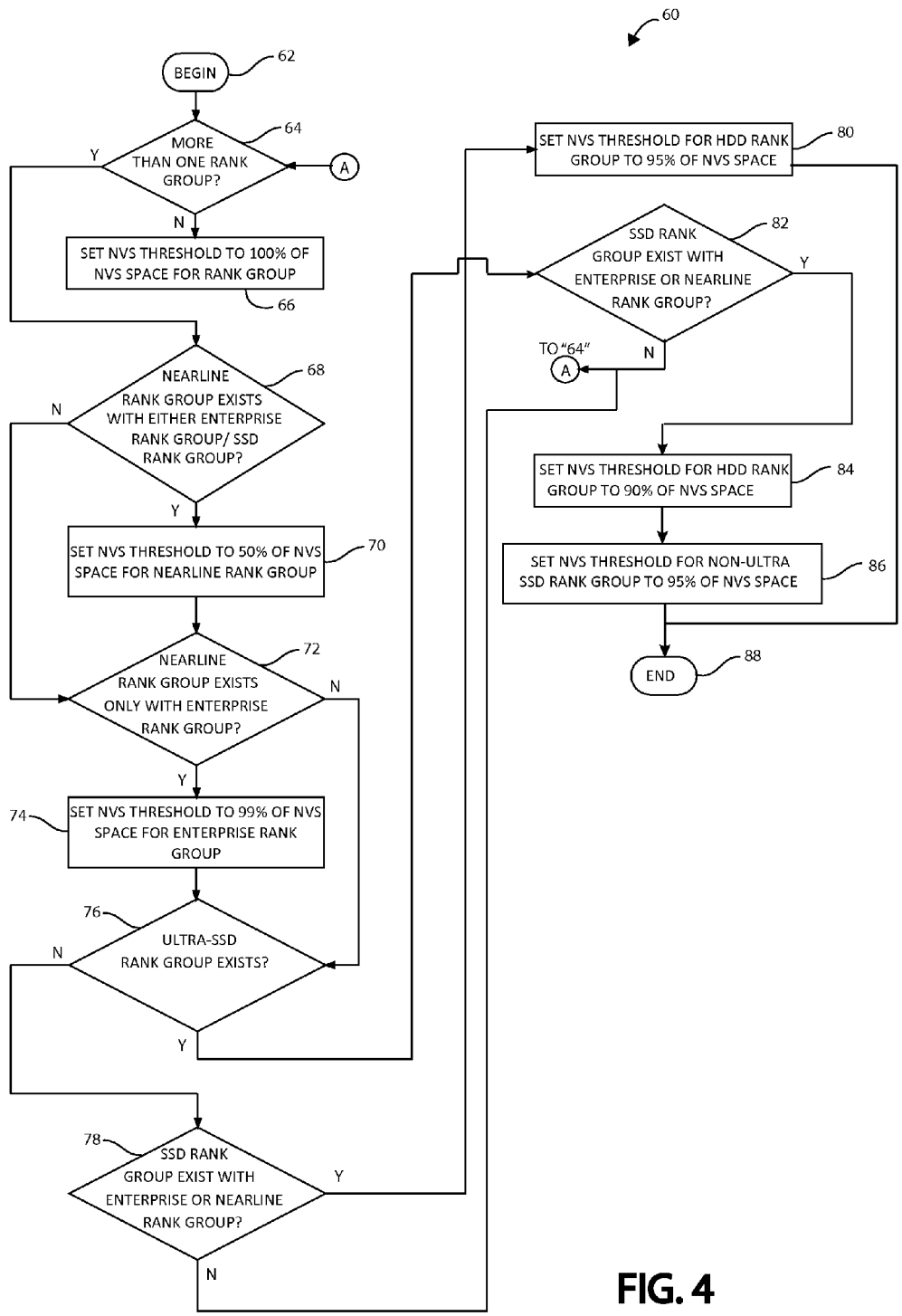
FIG. 4 is a flow chart diagram of exemplary method for non-volatile storage thresholding for solid-state device (SSD) rank group, Ultra-SSD rank group, and hard disk drive (HDD) rank group in which aspects of the present invention may be realized.

FIG. 4, following, illustrates exemplary method for non-volatile storage thresholding for solid-state device (SSD) rank group, Ultra-SSD rank group, and hard disk drive (HDD) rank group in which aspects of the present invention may be realized. As one skilled in the art will appreciate, various steps in the method 60 may be implemented in differing ways to suit a particular application. In addition, the described method may be implemented by various means, such as hardware, software, firmware, or a combination thereof operational on or otherwise associated with the computing storage environment. For example, the method may be implemented, partially or wholly, as a computer program product including a non-transitory computer-readable storage medium having computer-readable program code portions stored therein. The computer-readable storage medium may include disk drives, flash memory, digital versatile disks (DVDs), compact disks (CDs), and other types of storage mediums.

Method 60 begins (step 62) with a query as to whether more than one rank group (e.g., target storage device(s) in Enterprise rank group and target storage device(s) in the SSD rank group) is identified in the pool of storage devices (step 64). If this is not the case, then the NVS threshold is set to 100% of available NVS space for the single rank group (step 66), and the method returns to step 64 in the event that additional types of devices are later added to the storage pool.

In the event that more than one rank group is identified (again, step 64), then the method 60 queries as to whether the Nearline rank group is identified with either the Enterprise rank group, the SSD rank group, and/or the Ultra-SSD rank (step 68). If this is the case, then the NVS threshold is set to approximately 50% of the NVS space for the Nearline rank group (step 70). In other words, approximately half of the available NVS space is allocated to the Nearline rank group. If the Nearline rank group is determined to exist with only the Enterprise rank group (step 72), then the NVS threshold is set to approximately 99% of NVS space for the Enterprise rank group (step 74).

As a next step, the method 60 determines if the Ultra-SSD rank group exists (step 76). If no, then the method 60 determines if the SSD rank group exists with either the Enterprise rank group and/or Nearline rank group (step 78). If no, the method 60 returns to step 64 in the event that additional types of devices are later added to the storage pool. If the SSD rank group exists with either the Enterprise rank group and/or Nearline rank group, the method 60 sets the NVS threshold for the combined Nearline rank group and the Enterprise rank group to approximately 95% of the available NVS space (step 80). In the depicted embodiment, the allocation of NVS space is approximately 95%, although the skilled artisan will appreciate that in varying implementations, at least a majority of the NVS space is allocated to the combined Nearline rank group and the Enterprise rank group. In this manner, the NVS space is allocated to the devices that are currently in use, allowing for the greatest performance and efficiency. Also, step 80 guarantees that the SSD rank group has a minimum of 5% of NVS. This reduced HDD threshold allows for the faster SDD ranks to not have to wait behind the slower HDD ranks to obtain NVS space. This in turn increases the SSD peak performance, and does not impact the slower HDD rank performance.

Returning to step 76, if the Ultra-SSD rank group does exists, then the method 60 determines if the SSD rank group exists with either the Enterprise rank group and/or Nearline rank group (step 82). If no, the method 60 returns to step 64 in the event that additional types of devices are later added to the storage pool. If the SSD rank group exists with either the Enterprise rank group and/or Nearline rank group, the method 60 sets the NVS threshold for the combined Nearline rank group and the Enterprise rank group to approximately 90% of the available NVS space (step 84) and sets the NVS threshold for the combined SSD rank group, Nearline rank group, and the Enterprise rank group (e.g., the Non-Ultra SSD rank group) to approximately 95% of the available NVS space (step 86). In the depicted embodiment, the allocation of NVS space is approximately 95%, although the skilled artisan will appreciate that in varying implementations, at least a majority of the NVS space is allocated to the combined Nearline rank group and the Enterprise rank group. In this manner, the NVS space is allocated to the devices that are currently in use, allowing for the greatest performance and efficiency. Also, step 86 guarantees that the Ultra-SSD rank group has a minimum of 5% of NVS. This reduced HDD and SSD threshold allows for the faster Ultra-SDD ranks to not have to wait behind the slower ranks to obtain NVS space. This in turn increases the Ultra-SSD peak performance, and does not impact the slower HDD and SSD performance. The method 60 ends (step 88).

Figure 5:
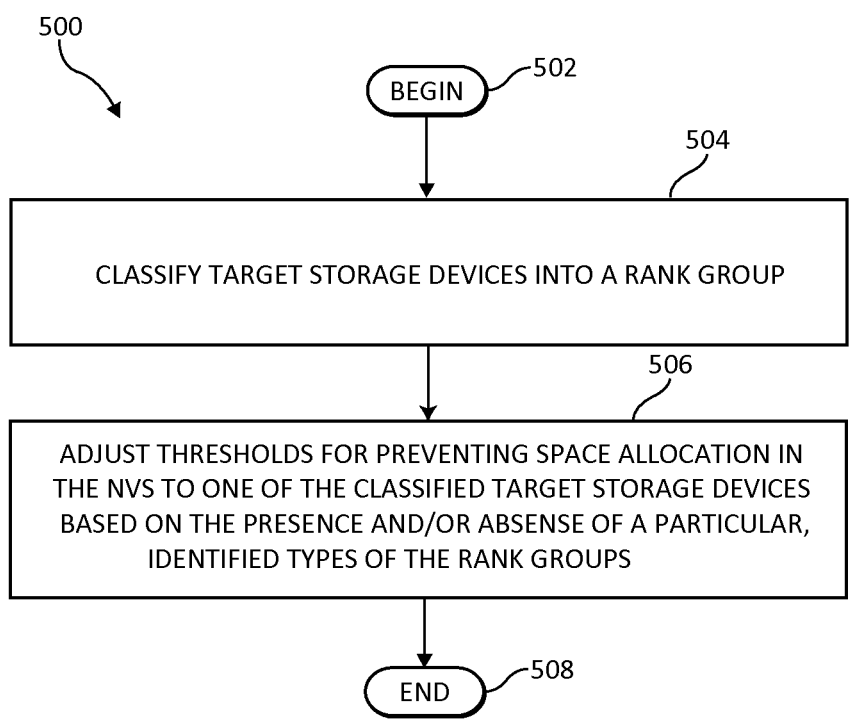
FIG. 5 is a flow chart diagram of exemplary additional method for non-volatile storage thresholding for solid-state device (SSD) rank group, Ultra-SSD rank group, and hard disk drive (HDD) rank group in which aspects of the present invention may be realized.

FIG. 5 is a flow chart diagram of exemplary additional method for non-volatile storage thresholding for solid-state device (SSD) rank group, Ultra-SSD rank group, and hard disk drive (HDD) rank group in which aspects of the present invention may be realized. The method 500 begins (step 502) by classifying target storage devices into one of 4 four types of rank groups (step 504). In one embodiment, the target storage devices are classified into a Nearline rank group, an Enterprise rank group, an SSD rank group, and/or an Ultra-SSD rank group. The method 500 adjusts thresholds for preventing space allocation in the NVS for at least one classified target storage devices based on one of the presence and absence of identified types of the rank groups (step 506). The method 500 ends (step 508).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (e.g., a non-transitory computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for efficient thresholding of nonvolatile storage (NVS) for a plurality of types of storage rank groups by a processor, comprising:
    determining each target storage device in a pool of target storage devices as one of a hard disk drive (HDD) and a solid state drive (SSD) device, the each target storage device classified into one of a SSD rank group, a Nearline rank group, an Enterprise rank group, and an Ultra-SSD rank group in the pool of target storage devices, wherein the Nearline rank group and the Enterprise rank group comprise a HDD rank group, and the Nearline rank group, the Enterprise rank group, and the SSD rank group comprise the Non-Ultra-SSD rank group;
    adjusting thresholds for preventing space allocation in the NVS for at least one of the classified target storage devices based on one of the presence and absence of identified types of the classified target storage devices;
    setting a threshold of available space in the NVS to allocate at least a majority of available space to one of the HDD rank group, the SSD rank group, and the Ultra-SSD rank group;
    reducing the threshold of the available space in the NVS to allocate a greater portion of the available space to one of the HDD rank group, the SSD rank group, and the Ultra-SSD rank group; and,
    identifying when the Ultra-SSD rank group exists with one of the SSD rank group and HDD rank group,
    the setting of the threshold of the available space in the NVS further comprising:
        setting the threshold of the available space in the NVS to allocate a maximum of 90 percent of the available space to the Nearline rank group and the Enterprise rank group, which are combined together, when the Ultra-SSD rank group exists and the SSD rank group exists with one of the Enterprise rank group and the Nearline rank group; and
        setting the threshold of the available space in the NVS to allocate a maximum of 95 percent of the available space to the Nearline rank group, the Enterprise rank group, and the SSD rank group, which are combined together, when the Ultra-SSD rank group exists and the SSD rank group exists with one of the Enterprise rank group and the Nearline rank group, and
    the adjusting of the thresholds for preventing the space allocation in the NVS further comprising:
        adjusting the thresholds for preventing the space allocation in the NVS to one of the SSD rank group and the HDD rank group for allocating at least the majority of the available space to the Ultra-SSD rank; and
        adjusting the thresholds for preventing the space allocation in the NVS to the Ultra-SSD rank group for allocating the majority of the available space to one of the SSD rank group and the HDD rank group.

2. The method of claim 1, the setting of the threshold of the available space in the NVS further comprising: setting the threshold of the available space in the NVS to allocate a maximum of 50 percent of the available space to the Nearline rank group if the Nearline rank group exists with one of the Enterprise rank group, the SSD rank group, and the Ultra-SSD rank group.

3. The method of claim 1, the setting of the threshold of the available space in the NVS further comprising: setting the threshold of the available space in the NVS to allocate a maximum of 99 percent of the available space to the Enterprise rank group if the Enterprise rank group exists only with the Nearline rank group.

4. The method of claim 1, the setting of the threshold of the available space in the NVS further comprising: setting the threshold of the available space in the NVS to allocate a maximum of 95 percent of the available space to the Nearline rank group, and the Enterprise rank group, which are combined together, when the Ultra-SSD rank group does not exists and the SSD rank group does exist with one of the Enterprise rank group and the Nearline rank group.

5. The method of claim 1, further comprising any one or more of the following:
    allowing one of the plurality of types of storage rank groups to consume 100 percent of the NVS if only the one of the plurality of types of storage rank groups exists;
    allowing the Nearline rank group to consume a maximum of 50 percent of the NVS if the Nearline rank group exists with one of the Enterprise rank group, the SSD rank group, and the Ultra-SSD rank group;

allowing the Enterprise rank group to consume a maximum of 99 percent of the NVS if the Enterprise rank group exists only with the Nearline rank group;

allowing the Nearline rank group and the Enterprise rank group, which are combined together, to consume a maximum of 95 percent of the NVS when the Ultra-SSD rank group does not exist and the SSD rank group does exist with one of the Enterprise rank group and the Nearline rank group;

allowing the Nearline rank group, the Enterprise rank group, and the SSD rank group, which are combined together, to consume a maximum of 95 percent of the NVS when the Ultra-SSD rank group exists and the SSD rank group exists with one of the Enterprise rank group and the Nearline rank group; and allowing the Nearline rank group and the Enterprise rank group, which are combined together, to consume a maximum of 90 percent of the NVS when the Ultra-SSD rank group exists and the SSD rank group exists with one of the Enterprise rank group and the Nearline rank group.

6. A system for efficient thresholding of nonvolatile storage (NVS) for a plurality of types of storage rank groups in a computing environment, comprising:

a processor device in the computing environment, the processor device performing the following:

determining each target storage device in a pool of target storage devices as one of a hard disk drive (HDD) and a solid state drive (SSD) device, the each target storage device classified into one of a SSD rank group, a Nearline rank group, an Enterprise rank group, and an Ultra-SSD rank group in the pool of target storage devices, wherein the Nearline rank group and the Enterprise rank group comprise a HDD rank group, and the Nearline rank group, the Enterprise rank group, and the SSD rank group comprise the Non-Ultra-SSD rank group;

adjusting thresholds for preventing space allocation in the NVS for at least one of the classified target storage devices based on one of the presence and absence of identified types of the classified target storage devices;

setting a threshold of available space in the NVS to allocate a majority of available space to one of the HDD rank group, the SSD rank group, and the Ultra-SSD rank group;

reducing the threshold of the available space in the NVS to allocate a greater portion of the available space to one of the HDD rank group, the SSD rank group, and the Ultra-SSD rank group; and identifying when the Ultra-SSD rank group exists with one of the SSD rank group and HDD rank group, the setting the threshold of the available space in the NVS further comprising:

setting the threshold of the available space in the NVS to allocate a maximum of 90 percent of the available space to the Nearline rank group and the Enterprise rank group, which are combined together, when the Ultra-SSD rank group exists and the SSD rank group exists with one of the Enterprise rank group and the Nearline rank group; and setting the threshold of the available space in the NVS to allocate a maximum of 95 percent of the available space to the Nearline rank group, the Enterprise rank group, and the SSD rank group, which are combined together, when the Ultra-SSD rank group exists and the SSD rank group exists with one of the Enterprise rank group and the Nearline rank group, and the adjusting of the thresholds for preventing the space allocation in the NVS further comprising:

adjusting the thresholds for preventing the space allocation in the NVS to one of the SSD rank group and the HDD rank group for allocating the majority of the available space to the Ultra-SSD rank, and adjusting the thresholds for preventing the space allocation in the NVS to the Ultra-SSD rank group for allocating the majority of the available space to one of the SSD rank group and the HDD rank group.

7. The system of claim 6, the setting of the threshold of the available space in the NVS further comprising setting the threshold of the available space in the NVS to allocate a maximum of 50 percent of the available space to the Nearline rank group if the Nearline rank group exists with one of the Enterprise rank group, the SSD rank group, and the Ultra-SSD rank group.

8. The system of claim 6, the setting of the threshold of the available space in the NVS further comprising setting the threshold of the available space in the NVS to allocate a maximum of 99 percent of the available space to the Enterprise rank group if the Enterprise rank group exists only with the Nearline rank group.

9. The system of claim 6, the setting of the threshold of the available space in the NVS further comprising setting the threshold of the available space in the NVS to allocate a maximum of 95 percent of the available space to the Nearline rank group, and the Enterprise rank group, which are combined together, when the Ultra-SSD rank group does not exists and the SSD rank group does exist with one of the Enterprise rank group and the Nearline rank group.

10. The system of claim 6, the processor device further performing any one or more of the following:

allowing one of the plurality of types of storage rank groups to consume 100 percent of the NVS if only the one of the plurality of types of storage rank groups exists;

allowing the Nearline rank group to consume a maximum of 50 percent of the NVS if the Nearline rank group exists with one of the Enterprise rank group, the SSD rank group, and the Ultra-SSD rank group;

allowing the Enterprise rank group to consume a maximum of 99 percent of the NVS if the Enterprise rank group exists only with the Nearline rank group;

allowing the Nearline rank group and the Enterprise rank group, which are combined together, to consume a maximum of 95 percent of the NVS when the Ultra-SSD rank group does not exist and the SSD rank group does exist with one of the Enterprise rank group and the Nearline rank group;

allowing the Nearline rank group, the Enterprise rank group, and the SSD rank group, which are combined together, to consume a maximum of 95 percent of the NVS when the Ultra-SSD rank group does exists and the SSD rank group does exist with one of the Enterprise rank group and the Nearline rank group; and allowing the Nearline rank group and the Enterprise rank group, which are combined together, to consume a maximum of 90 percent of the NVS when the Ultra-SSD rank group does exist and the SSD rank group does exist with one of the Enterprise rank group and the Nearline rank group.

11. A computer program product for efficient thresholding of nonvolatile storage (NVS) for a plurality of types of storage rank groups in a computing environment by a processor, the computer program product comprising a computer-readable storage medium having computer-readable program code portions stored therein, the computer readable program code portions comprising:
- a first executable portion that determines each target storage device in a pool of target storage devices as one of a hard disk drive (HDD) and a solid state drive (SSD) device, the each target storage device classified into one of a SSD rank group, a Nearline rank group, an Enterprise rank group, and an Ultra-SSD rank group in the pool of target storage devices, wherein the Nearline rank group and the Enterprise rank group comprise a HDD rank group, and the Nearline rank group, the Enterprise rank group, and the SSD rank group comprise the Non-Ultra-SSD rank group;
- a second executable portion that adjusts thresholds for preventing space allocation in the NVS for at least one of the classified target storage devices based on one of the presence and absence of identified types of the classified target storage devices;
- a third executable portion that sets the threshold of the available space in the NVS to allocate a majority of available space to one of the HDD rank group, the SSD rank group, and the Ultra-SSD rank group; and
- a fourth executable portion that reduces the threshold of the available space in the NVS to allocate a greater portion of the available space to one of the HDD rank group, the SSD rank group, and the Ultra-SSD rank group; and,
- a fifth executable portion that identifies when the Ultra-SSD rank group exists with one of the SSD rank group and HDD rank group, the second executable portion adjusting the thresholds for preventing the space allocation in the NVS by:
- adjusting the thresholds for preventing the space allocation in the NVS to one of the SSD rank group and the HDD rank group for allocating at least the majority of the available space to the Ultra-SSD rank; and
- adjusting the thresholds for preventing the space allocation in the NVS to the Ultra-SSD rank group for allocating at least the majority of the available space to one of the SSD rank group and the HDD rank group, and the third executable portion setting the threshold the threshold of the available space in the NVS by:
- setting the threshold of the available space in the NVS to allocate a maximum of 50 percent of the available space to the Nearline rank group if the Nearline rank group exists with one of the Enterprise rank group, the SSD rank group, and the Ultra-SSD rank group;
- setting the threshold of the available space in the NVS to allocate a maximum of 90 percent of the available space to the Nearline rank group and the Enterprise rank group, which are combined together, when the Ultra-SSD rank group exists and the SSD rank group exists with one of the Enterprise rank group and the Nearline rank group; and
- setting the threshold of the available space in the NVS to allocate a maximum of 95 percent of the available space to the Nearline rank group, the Enterprise rank group, and the SSD rank group, which are combined together, when the Ultra-SSD rank group exists and the SSD rank group exists with one of the Enterprise rank group and the Nearline rank group.

12. The computer program product of claim 11, the third executable portion further performing one or more of the following:
- setting the threshold of the available space in the NVS to allocate at most approximately 95 percent of the available space to the Nearline rank group, the Enterprise rank group, and the SSD rank group, which are combined together, when the Ultra-SSD rank group exists and the SSD rank group exists with one of the Enterprise rank group and the Nearline rank group;
- allowing one of the plurality of types of storage rank groups to consume 100 percent of the NVS if only the one of the plurality of types of storage rank groups exists;
- allowing the Nearline rank group to consume a maximum of 50 percent of the NVS if the Nearline rank group exists with one of the Enterprise rank group, the SSD rank group, and the Ultra-SSD rank group;
- allowing the Enterprise rank group to consume a maximum of 99 percent of the NVS if the Enterprise rank group exists only with the Nearline rank group;
- allowing the Nearline rank group and the Enterprise rank group, which are combined together, to consume a maximum of 95 percent of the NVS when the Ultra-SSD rank group does not exist and the SSD rank group does exist with one of the Enterprise rank group and the Nearline rank group; and
- allowing the Nearline rank group and the Enterprise rank group, which are combined together, to consume a maximum of 90 percent of the NVS when the Ultra-SSD rank group does exist and the SSD rank group does exist with one of the Enterprise rank group and the Nearline rank group.

* * * * *